(12) United States Patent
Inoue et al.

(10) Patent No.: US 9,047,779 B2
(45) Date of Patent: Jun. 2, 2015

(54) VEHICLE REAR VIEW MONITORING DEVICE

(75) Inventors: Satoru Inoue, Tokyo (JP); Ryotaro Suzuki, Tokyo (JP); Tatsuya Mitsugi, Tokyo (JP); Hirokazu Shimizu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 432 days.

(21) Appl. No.: 13/582,691

(22) PCT Filed: May 19, 2010

(86) PCT No.: PCT/JP2010/003365
§ 371 (c)(1),
(2), (4) Date: Sep. 4, 2012

(87) PCT Pub. No.: WO2011/145141
PCT Pub. Date: Nov. 24, 2011

(65) Prior Publication Data
US 2012/0327239 A1 Dec. 27, 2012

(51) Int. Cl.
*H04N 7/00* (2011.01)
*H04N 9/47* (2006.01)
(Continued)

(52) U.S. Cl.
CPC .. *G08G 1/16* (2013.01); *B60R 1/00* (2013.01);
*B60R 2300/301* (2013.01); *B60R 2300/307*
(2013.01); *B60R 2300/607* (2013.01); *B60R 2300/70* (2013.01); *G01S 7/6245* (2013.01);
*G01S 15/876* (2013.01); *G01S 15/931*
(2013.01); *G01S 2015/932* (2013.01); *G01S 2015/933* (2013.01)

(58) Field of Classification Search
CPC B60R 1/00; B60R 2300/301; B60R 2300/70;
B60R 2300/607; B60R 2300/806; B60R
2300/8093; B60R 2300/305; B60R 19/483;
G01S 15/931; G01S 15/936; G01S 2013/9378;
G01S 15/42; G01S 2015/939; G01S 17/87;
G01S 2015/934; B62D 15/029
USPC ........... 348/113, 118, 148; 382/103; 340/435,
340/436, 437; 367/98
See application file for complete search history.

(56) References Cited

U.S. PATENT DOCUMENTS 7,176,959 B2 * 2/2007 Sato et al. ...................... 348/148
7,358,850 B2 * 4/2008 Simonazzi ..................... 340/435
(Continued)

FOREIGN PATENT DOCUMENTS

JP 2004-138481 A 5/2004
JP 2005-12465 A 1/2005
(Continued)

*Primary Examiner* — Brian Yenke
(74) *Attorney, Agent, or Firm* — Birch, Stewart, Kolasch & Birch, LLP

(57) ABSTRACT

Because a vehicle rear view monitoring device changes the detection threshold level of each of distance sensors 4-1 to 4-4 to change horizontal and vertical detection areas and a bearing resolution, determines the display position of an obstacle mark 16 from the distances to an obstacle 15 detected by the plurality of distance sensors 4-1 to 4-4, and amplitude information about the amplitude of a reflected wave from the obstacle, and overlays the obstacle mark 16 on the obstacle 15 by using an overlay unit 17, the vehicle rear view monitoring device improves the degree of positional precision of the overlay of the obstacle mark on the obstacle displayed on a captured image.

10 Claims, 22 Drawing Sheets

(51) Int. Cl.
*B60Q 1/00* (2006.01)
*G06K 9/00* (2006.01)
*G08G 1/16* (2006.01)
*B60R 1/00* (2006.01)
*G01S 7/62* (2006.01)
*G01S 15/87* (2006.01)
*G01S 15/93* (2006.01)

(56) References Cited

U.S. PATENT DOCUMENTS

| | | | |
|---|---|---|---|
| 7,567,168 B2 * | 7/2009 | Li | 340/435 |
| 7,894,631 B2 * | 2/2011 | Kakinami | 382/103 |
| 7,898,434 B2 * | 3/2011 | Taniguchi et al. | 340/937 |
| 8,218,007 B2 * | 7/2012 | Lee et al. | 348/148 |
| 8,305,444 B2 * | 11/2012 | Hada | 348/148 |
| 8,446,471 B2 * | 5/2013 | Wu et al. | 348/148 |
| 8,503,265 B2 * | 8/2013 | Akiyama et al. | 367/93 |
| 8,855,850 B2 * | 10/2014 | Suzuki et al. | 340/932.2 |
| 2004/0153243 A1 * | 8/2004 | Shimazaki et al. | 701/300 |
| 2005/0225439 A1 * | 10/2005 | Watanabe et al. | 340/435 |
| 2005/0231341 A1 * | 10/2005 | Shimizu | 340/436 |
| 2006/0077049 A1 * | 4/2006 | Kato et al. | 340/435 |
| 2006/0231321 A1 * | 10/2006 | Takahashi | 180/274 |
| 2006/0274147 A1 * | 12/2006 | Chinomi et al. | 348/118 |
| 2007/0120656 A1 * | 5/2007 | Nakanishi et al. | 340/435 |
| 2007/0182527 A1 * | 8/2007 | Traylor et al. | 340/435 |
| 2007/0291590 A1 * | 12/2007 | Harada et al. | 367/99 |
| 2008/0122604 A1 * | 5/2008 | Hattori et al. | 340/441 |
| 2008/0195285 A1 * | 8/2008 | Shimizu | 701/45 |
| 2008/0231702 A1 * | 9/2008 | Matsumoto et al. | 348/148 |
| 2009/0059006 A1 * | 3/2009 | Hattori et al. | 348/148 |
| 2009/0122140 A1 * | 5/2009 | Imamura | 348/148 |
| 2010/0141414 A1 * | 6/2010 | Matsumoto et al. | 340/435 |

FOREIGN PATENT DOCUMENTS

| | | |
|---|---|---|
| JP | 2005-56336 A | 3/2005 |
| JP | 2006-168525 A | 6/2006 |
| JP | 2007-140852 A | 6/2007 |
| JP | 2008-195268 A | 8/2008 |
| JP | 2009-65483 A | 3/2009 |
| JP | 2009-173239 A | 8/2009 |

* cited by examiner

FIG.4
(a) (Threshold: Hth1)
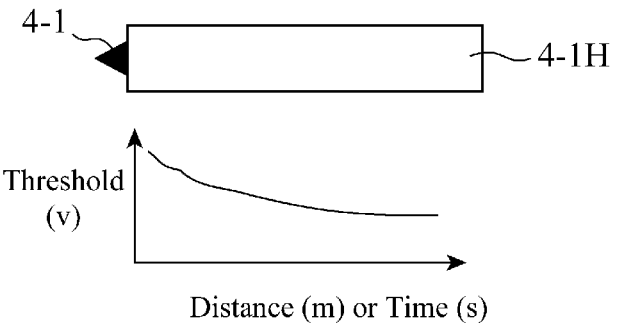
(b) (Threshold: Hth2)
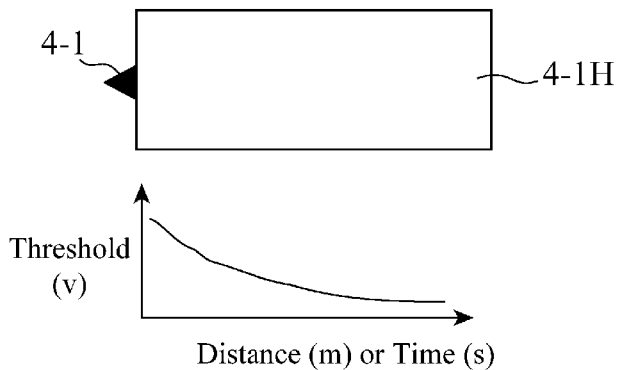
(c) (Threshold: Hth3)
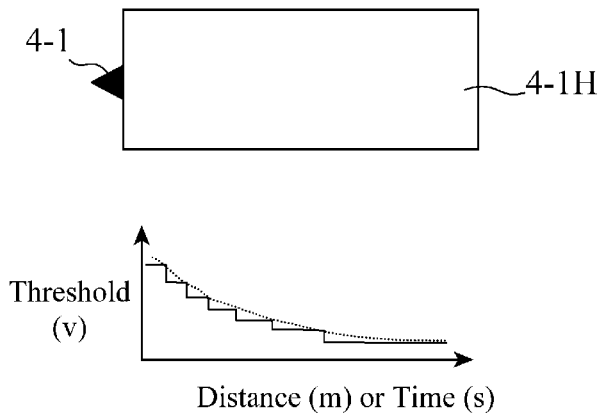

FIG.7
(a) (Threshold: Vth1)
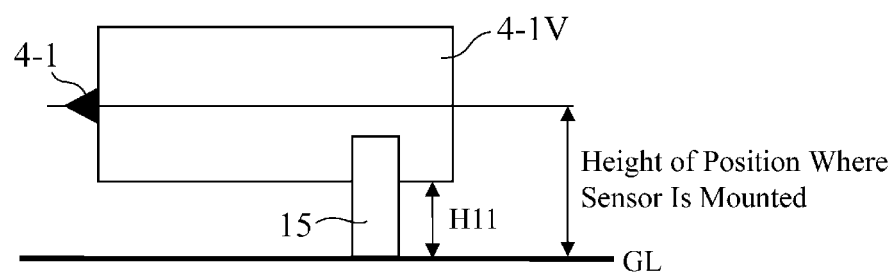
(b) (Threshold: Vth2)
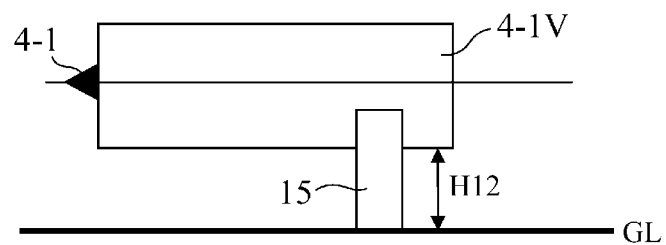
(c) (Threshold: Vth3)
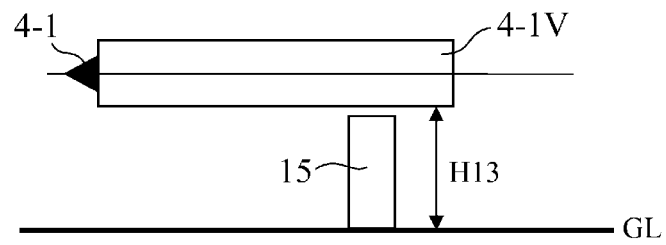

FIG.19
(a)
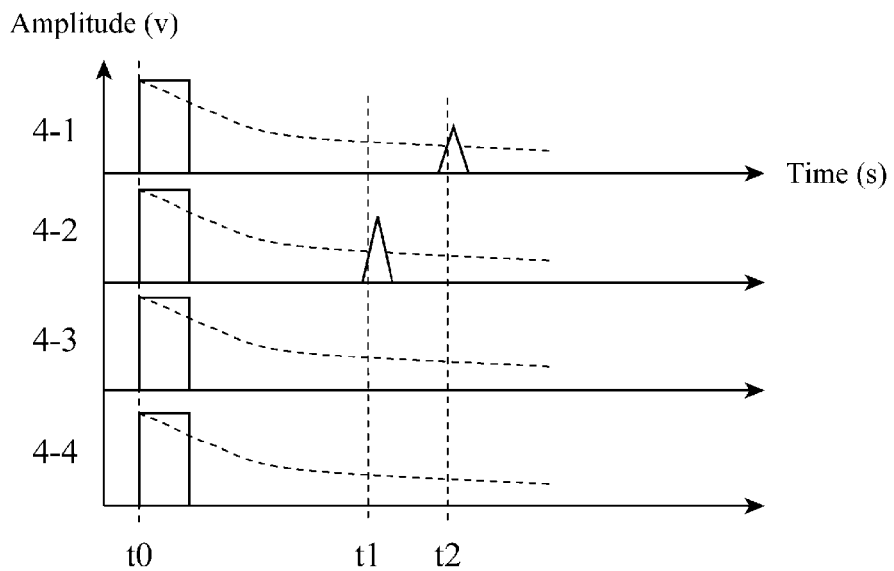
(b)
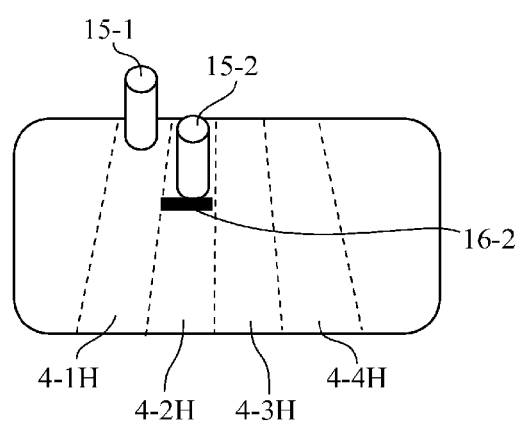
(c)
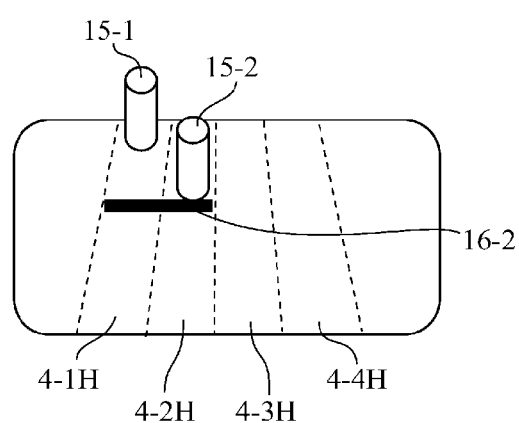

FIG.21
(a)
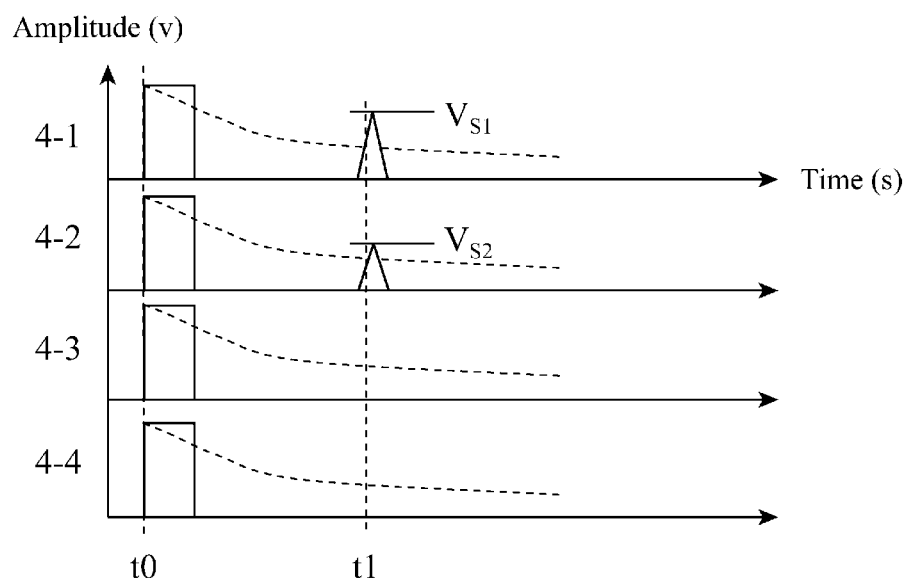
(b)
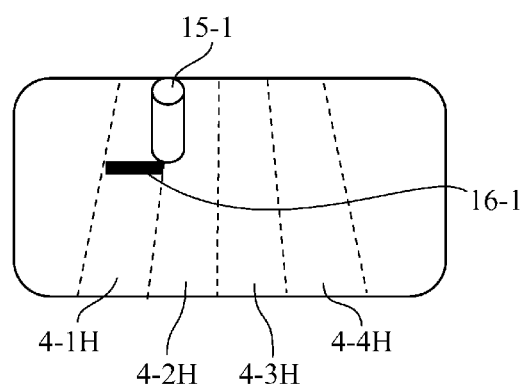

FIG.22
(a)
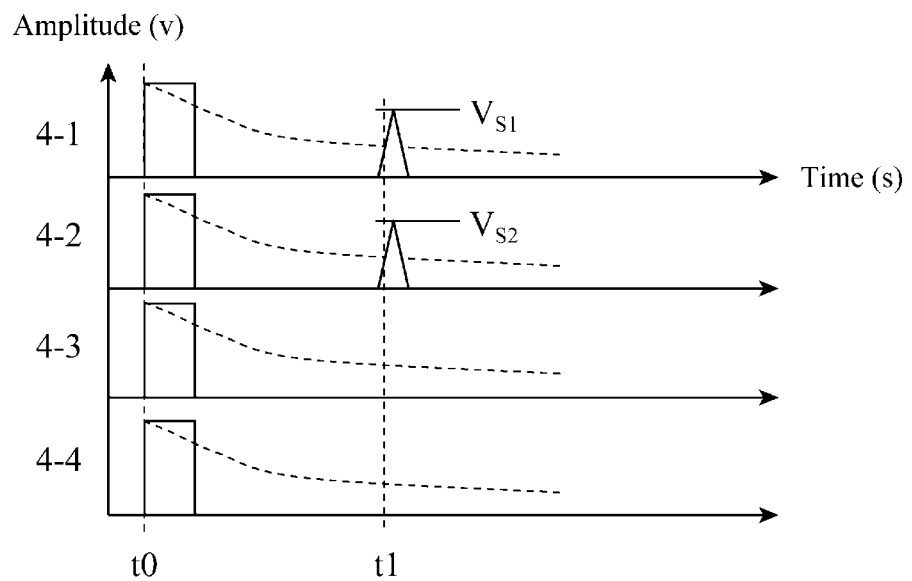
(b)
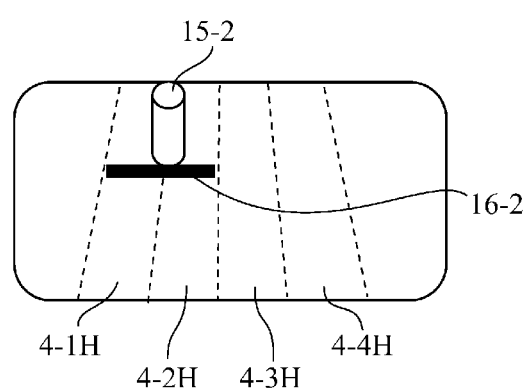

FIG.24
(a)
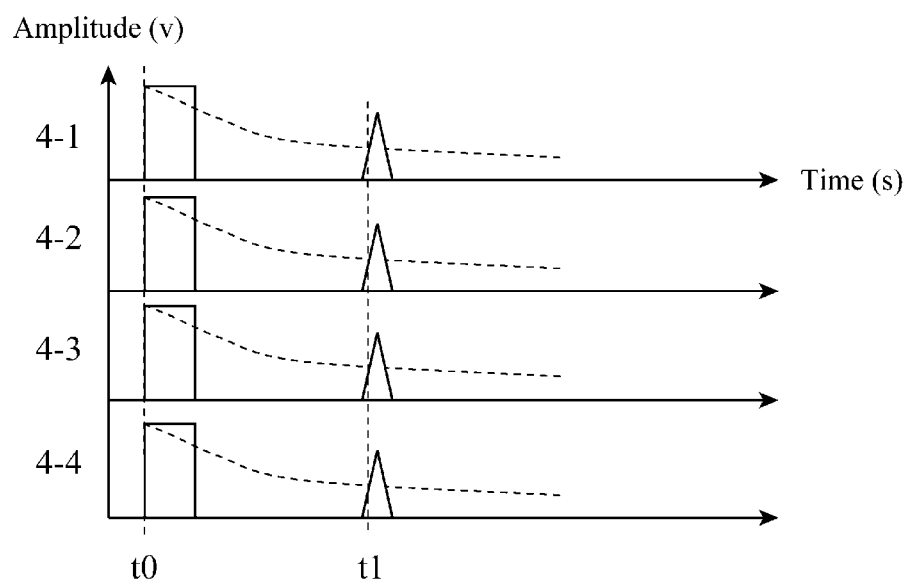
(b)
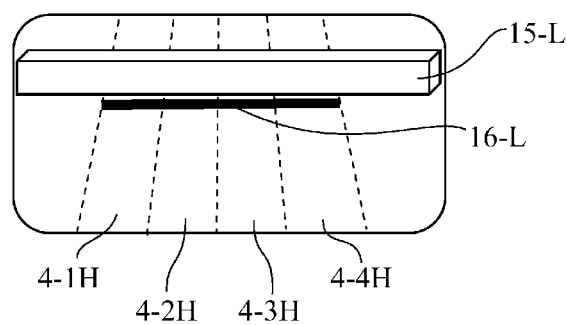

VEHICLE REAR VIEW MONITORING DEVICE

FIELD OF THE INVENTION

The present invention relates to a vehicle rear view monitoring device including a wide angle camera mounted to a rear portion of a vehicle, for capturing an image of an area behind the vehicle, a plurality of distance sensors mounted to the rear portion of the vehicle, for detecting the distance to an obstacle, and an image display unit for overlaying a mark showing the obstacle at a position detected by the distance sensor on the image captured by the wide angle camera to specify the position of the obstacle.

BACKGROUND OF THE INVENTION

Backward monitoring using a wide angle camera (obstacle detection) cannot implement detection of the height of a static object and the height of an object. Further, a monocular camera cannot acquire distance information. On the other hand, a problem with detection of an obstacle using a distance sensor is that because the distance sensor is designed to detect a large area at a time, the bearing resolution of the distance sensor is low.

Conventionally, patent reference 1 discloses a related art technique as such a technique of detecting an obstacle.

RELATED ART DOCUMENT

Patent Reference

Patent reference 1: Japanese Unexamined Patent Application Publication No. 2007-140852

SUMMARY OF THE INVENTION

According to the related art technique described in patent reference 1, ultrasonic sensors consisting of one transmission and reception ultrasonic sensor and sensors exclusively for reception are used, a camera is located at the center of a portion where the ultrasonic sensors are arranged, and the position of an obstacle is determined from plural pieces of distance information from a plurality of distance sensors according to the principle underlying a triangulation technique. In order to make up for a disadvantage of detecting a virtual image when a plurality of obstacles are existing, the related art technique further has a function of detecting an optical flow from an image captured by the camera, determining the position of each obstacle on the image and making both the measured positions overlap each other to determine the position of the obstacle while displaying a certain synthesized image (the distance between an actualized image and the obstacle).

However, because the above-mentioned arithmetic processing of calculating distance information and the above-mentioned image processing require a large arithmetic load, the related art device becomes more expensive as the speed of the arithmetic processing and the speed of the image processing are enhanced according to user demands. A further problem is that because information about the height of an obstacle is not acquired, it is difficult to truly determine whether or not an obstacle is existing, for example.

The present invention is made in order to solve the above-mentioned problems, and it is therefore an object of the present invention to provide a vehicle rear view monitoring device which truly determines whether or not an obstacle is existing, thereby providing an improvement in the degree of positional precision of an overlay of an obstacle mark on an image captured by a camera.

In accordance with the present invention, there is provided a vehicle rear view monitoring device including a plurality of distance sensors each for detecting a distance to an obstacle, a threshold level changing unit for changing a detection threshold level of each of the distance sensors to change a horizontal detection area, a vertical detection area, and a bearing resolution, an obstacle determination unit for determining whether or not an obstacle is existing according to a threshold level outputted from the threshold level changing unit and received signals of the distance sensors, and a display screen switching unit for changing a display image between a directly-captured image and a bird's-eye view image according to the distance to the obstacle determined by the obstacle determination unit, in which the vehicle rear view monitoring device comprises: an overlay unit for measuring a bearing of the obstacle and a distance to the obstacle from a position where each of the distance sensors is mounted and the distance to the obstacle, and amplitude information about an amplitude of a reflected wave from the obstacle, the position and the distance to the obstacle being determined by the obstacle determination unit, for determining a display position and a shape of an obstacle mark according to a corresponding distance and a corresponding bearing on a screen, for changing a display image as an expression of the obstacle mark between a directly-captured image and a bird's-eye view image when the distance to the obstacle determined by the obstacle determination unit has a predetermined value, and for overlaying the obstacle mark having the above-mentioned determined shape on an image captured by a camera and furnished from the display screen switching unit in such a way that the obstacle mark is positioned at the above-mentioned determined display position.

Because the vehicle rear view monitoring device in accordance with this invention can determine the horizontal position of an obstacle, the vehicle rear view monitoring device can improve the degree of positional precision of an overlay of an obstacle mark on the obstacle shown in an image captured thereby.

BRIEF DESCRIPTION OF THE FIGURES

FIG. 4 is a view showing the horizontal detection area of each distance sensor which changes according to a change of a detection threshold;

FIG. 7 is a view showing the vertical detection area of each distance sensor which changes according to a change of a detection threshold;

FIG. 19(a) is a view showing the transmitting and receiving states of the plurality of distance sensors in the state shown in FIG. 18, and FIG. 19(b) and FIG. 19(c) are views showing states in which the obstacles detected through the transmission and reception of the plurality of distance sensors are displayed on a screen together with the detection areas of the distance sensors;

FIG. 21(a) is a view showing an example of the transmitting and receiving states of the plurality of distance sensors in the state shown in FIG. 20, and FIG. 21(b) is a view showing a state in which the obstacle detected through the transmission and reception of the plurality of distance sensors, which is existing over the detection areas with a difference in size between the detection areas, is displayed on a screen together with the detection areas of the distance sensors;

FIG. 22(a) is a view showing another example of the transmitting and receiving states of the plurality of distance sensors in the state shown in FIG. 20, and FIG. 22(b) is a view showing a state in which the obstacle detected through the transmission and reception of the plurality of distance sensors, which is existing over the detection areas with no difference in size between the detection areas, is displayed on a screen together with the detection areas of the distance sensors;

FIG. 24(a) is a view showing the transmitting and receiving states of the plurality of distance sensors in the state shown in FIG. 23, and FIG. 24(b) is a view showing a state in which the obstacle detected through the transmission and reception of the plurality of distance sensors is displayed on a screen together with the detection areas of the distance sensors.

EMBODIMENTS OF THE INVENTION

Hereafter, in order to explain this invention in greater detail, the preferred embodiments of the present invention will be described with reference to the accompanying drawings. Embodiment 1.

Figure 1:
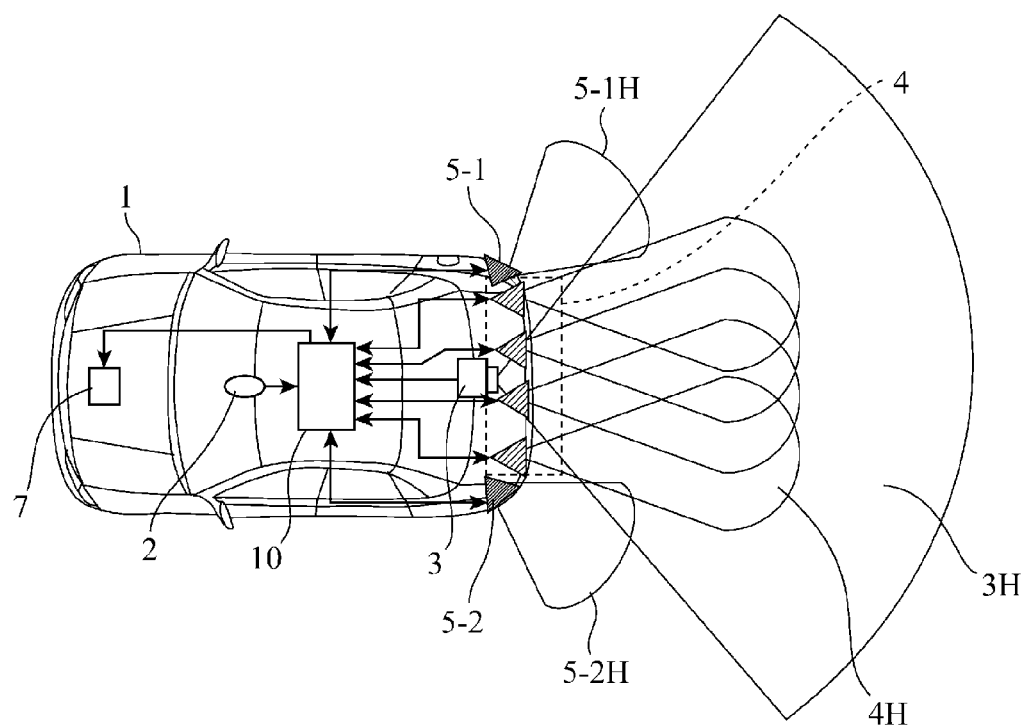
FIG. 1 is an outline diagram showing a structure in which a vehicle rear view monitoring device in accordance with the present invention is mounted in a vehicle.
Figure 2:
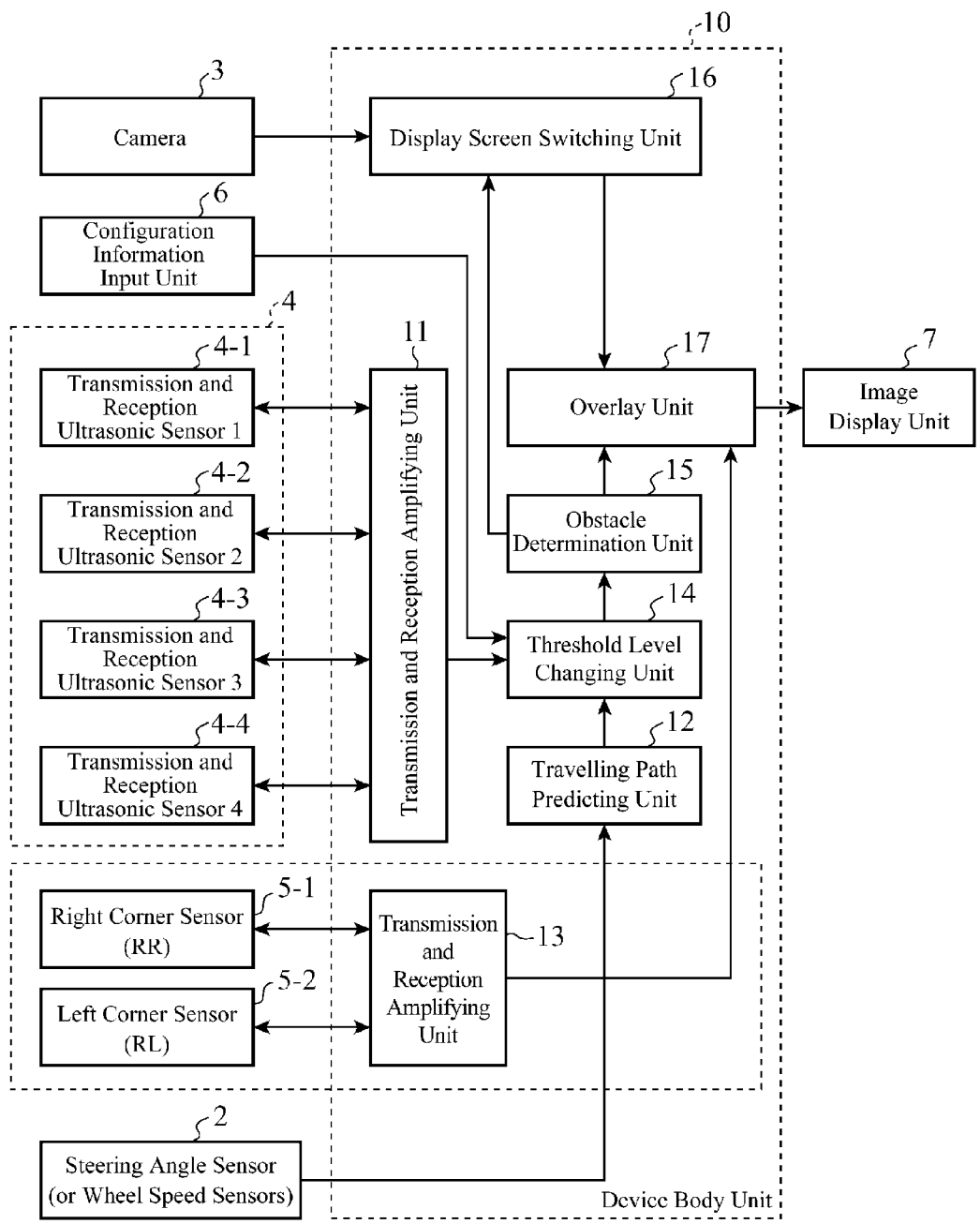
FIG. 2 is a block diagram showing the structure of the vehicle rear view monitoring device in accordance with the present invention.

FIG. 1 is an outline diagram showing a structure in which a vehicle rear view monitoring device in accordance with the present invention is mounted in a vehicle, and FIG. 2 is a block diagram showing the structure of the vehicle rear view monitoring device. Referring to FIG. 1, the vehicle 1 is provided with a steering angle sensor 2 disposed in a central portion thereof (or wheel speed sensors disposed in rear right and left portions thereof), a camera 3 disposed at the center of a rear portion thereof, ultrasonic sensors 4 (4-1 to 4-4) arranged on a rear end surface thereof as distance sensors, corner sensors 5-1 and 5-2 respectively disposed on right and left sides of the rear end surface, and an image display unit 7 disposed at the center of a front portion thereof where a user is enabled to visually recognize information displayed on the image display unit. The camera 3 has an image capturing area 3H, each of the ultrasonic sensors 4 has a detection area 4H, and the corner sensors 5-1 and 5-2 have detection areas 5-1H and 5-2H, respectively.

Referring to FIG. 2, a device body unit 10 is provided with a transmission and reception amplifying unit 11, a travelling path predicting unit 12, a transmission and reception amplifying unit 13, a threshold level changing unit 14, an obstacle determination unit 15, a display screen switching unit 16, and an overlay unit 17.

The camera 3 and the obstacle determination unit 15 are connected to the display screen switching unit 16, the transmission and reception ultrasonic sensors 4-1 to 4-4 are connected to the transmission and reception amplifying unit 11, the steering angle sensor 2 (or the wheel speed sensors disposed in the rear right and left portions of the vehicle) is connected to the travelling path predicting unit 12, and the corner sensors 5-1 and 5-2 are connected to the transmission and reception amplifying unit 13. Further, the transmission and reception amplifying unit 11, the travelling path predicting unit 12, and a configuration information input unit 6 are connected to the threshold level changing unit 14, the threshold level changing unit 14 is connected to the obstacle determination unit 15, the obstacle determination unit 15 and the display screen switching unit 16 are connected to the overlay unit 17, and an output of this overlay unit 17 is furnished to the image display unit 7.

While each of the detection areas 4-1H to 4-4H of the transmission and reception ultrasonic sensors 4-1 to 4-4 can be formed into a radial or rectangular shape according to a detection threshold level outputted from the threshold level changing unit 14, the width or the length of each of the detection areas 4-1H to 4-4H can be changed according to an output of the travelling path predicting unit 12 even when each of the detection areas of the transmission and reception ultrasonic sensors is formed into a rectangular shape.

Figure 3:
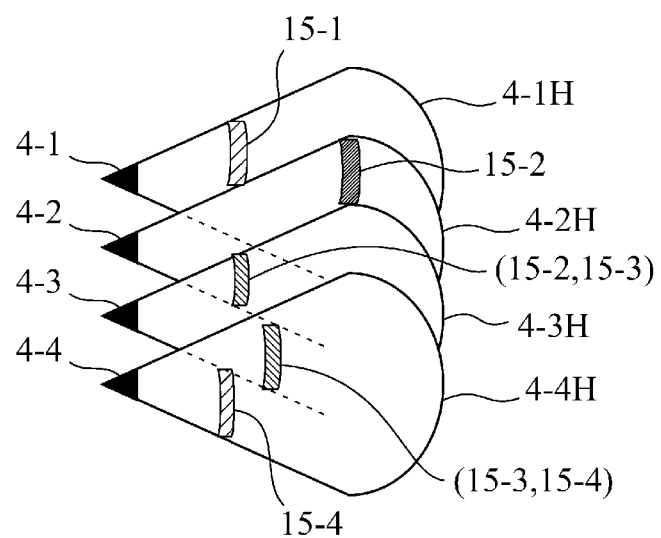
FIG. 3 is a view showing the detection areas of a plurality of distance sensors.

FIG. 3 shows a case in which the detection areas 4-1H to 4-4H of the transmission and reception ultrasonic sensors 4-1 to 4-4 have a radial shape. In this figure, obstacles 15-1 to 15-4 respectively detected in the detection areas 4-1H to 4-4H are shown while being overlaid on the detection areas. As a method of overlaying an obstacle in this way, the following methods are provided.

A mark showing each of the obstacles 15-1 to 15-4 is displayed at a position and in a direction on a captured image which correspond to the distance and the bearing of that obstacle.

Numerical values respectively showing the distance to and the height of each of the obstacles 15-1 to 15-4 are displayed.

The color of a mark showing the position of each of the obstacles is changed and displayed according to the distance to and the height of that obstacle.

FIGS. 4(a) to 4(c) show states in which the rectangle-shaped horizontal detection areas of the transmission and reception ultrasonic sensors 4-1 (to 4-4) are changed according to the thresholds Hth1 to Hth3.

Figure 5:
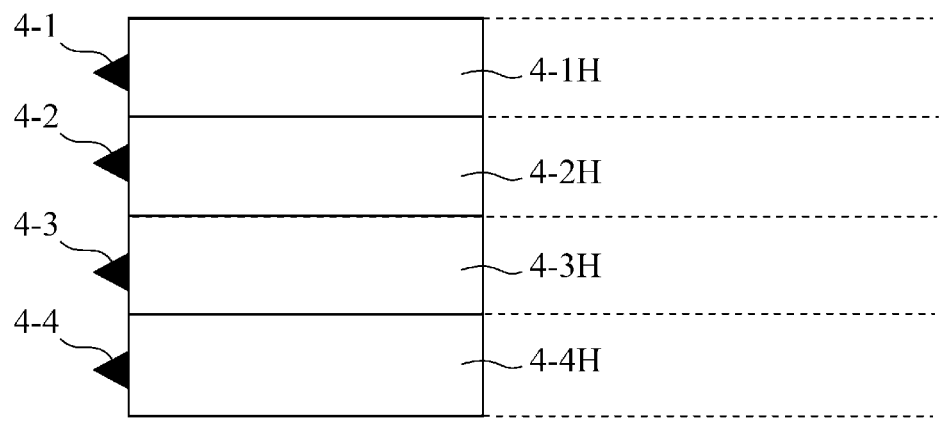
FIG. 5 is a view in a case in which the detection areas of a plurality of distance sensors do not overlap each other.

FIG. 5 shows an example in which the detection thresholds each based on a distance or a propagation time are set according to the propagation distance-sensitivity characteristics of the transmission and reception ultrasonic sensors 4-1 to 4-4, each of the detection areas 4-1H to 4-4H is formed into a rectangular shape, and the set detection thresholds or the distances at which the transmission and reception ultrasonic sensors 4-1 to 4-4 are respectively placed are changed in such a way that the detection areas of the transmission and reception ultrasonic sensors 4-1 to 4-4 are arranged in parallel with one another while the detection areas of any two horizontally adjacent transmission and reception ultrasonic sensors do not overlap each other.

Figure 6:
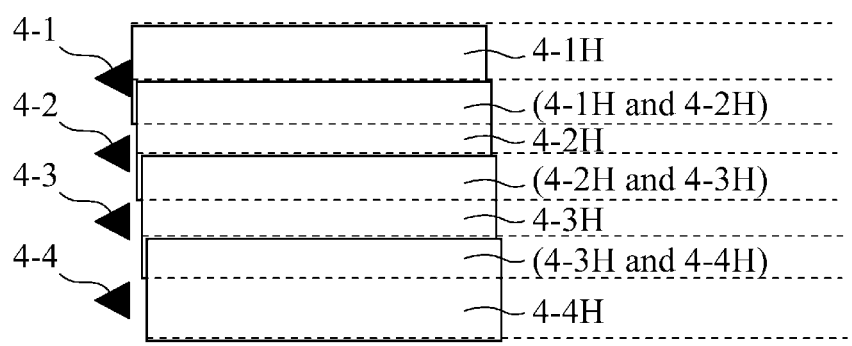
FIG. 6 is a view in a case in which the detection areas of a plurality of distance sensors partially overlap each other.

FIG. 6 shows an example in which the detection thresholds each based on a distance or a propagation time are set according to the propagation distance-sensitivity characteristics of the transmission and reception ultrasonic sensors 4-1 to 4-4, each of the detection areas 4-1H to 4-4H is formed into a rectangular shape, and the set detection thresholds or the distances at which the transmission and reception ultrasonic sensors 4-1 to 4-4 are respectively placed are changed in such a way that the detection areas of the transmission and reception ultrasonic sensors 4-1 to 4-4 are arranged while the detection areas of any two horizontally adjacent transmission and reception ultrasonic sensors partially overlaps each other. By implementing a logical AND operation on the results of detections of an obstacle at the same distance in two adjacent detection areas which partially overlap each other, the vehicle rear view monitoring device determines the bearing of the obstacle.

FIGS. 7(a) to 7(c) show a function of sequentially switching among detection thresholds Vth1 to Vth3 for the transmission and reception ultrasonic sensors 4-1 (to 4-4) to set each of the detection thresholds to the threshold level changing unit 14, thereby changing the rectangle-shaped vertical detection areas 4-1V to 4-4V of the transmission and reception ultrasonic sensors, and determining whether or not an obstacle is existing in a detection area having a detectable maximum height. According to this function, for example, the vehicle rear view monitoring device determines that it can detect an obstacle in the case of setting each of the thresholds Vth1 and Vth2 shown in FIGS. 7(a) and 7(b) while it cannot detect the obstacle in the case of setting the threshold Vth3 shown in FIG. 7(c). That is, the vehicle rear view monitoring device can easily make a distinction between a low-lying obstacle, such as a curbstone, and other objects.

Figure 8:
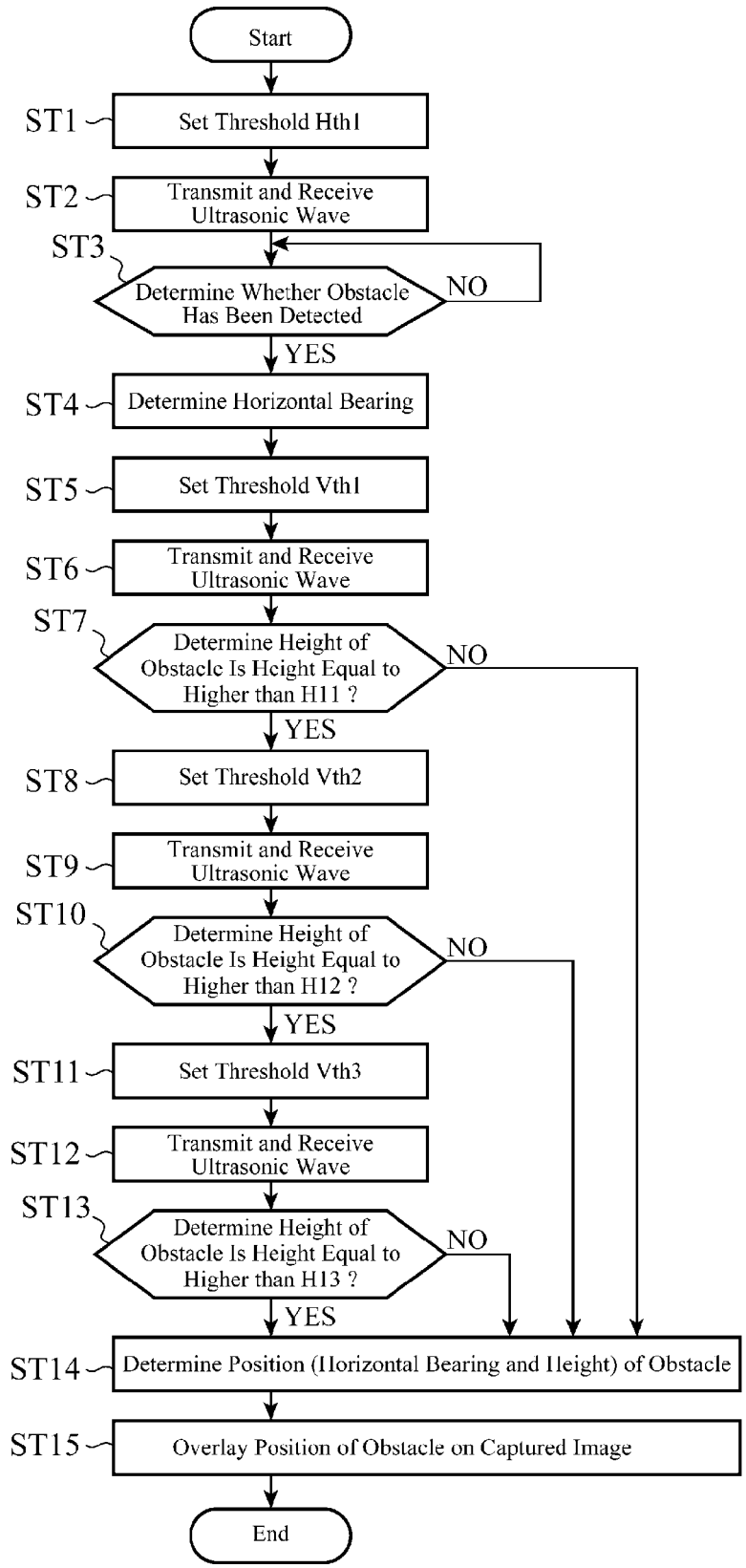
FIG. 8 is a flow of determination of the bearing and the height of an obstacle using distance sensors.

FIG. 8 shows a flow of determination of the bearing and the height of an obstacle using the transmission and reception ultrasonic sensors 4-1 to (4-4). When the flow starts, the vehicle rear view monitoring device, in step ST1, sets the threshold Hth1 from the configuration information input unit 6 to the threshold level changing unit 14, and, in step ST2, carries out transmission and reception by using the transmission and reception ultrasonic sensors 4-1 to 4-4. The obstacle determination unit 15 then, in step ST3, carries out a determination of whether the transmission and reception ultrasonic sensors 4-1 to 4-4 have detected an obstacle according to output signals furnished thereto, via the transmission and reception amplifying unit 11 and the threshold level changing unit 14, from the transmission and reception ultrasonic sensors 4-1 to 4-4. When determining NO, the obstacle determination unit repeats the obstacle detection determination.

When the determination result of step ST3 is YES, the obstacle determination unit, in step ST5, sets the threshold Vth1 from the configuration information input unit 6 to the threshold level changing unit 14 after, in step ST4, carrying out a determination of the horizontal bearing of the object, and, in step ST6, carries out transmission and reception using the transmission and reception ultrasonic sensors 4-1 to 4-4. The obstacle determination unit then, in step ST7, determines whether or not the height of the obstacle is equal to or lower than H11, and, when determining NO, shifts to step ST14, whereas when determining YES, the obstacle determination unit, in step ST8, sets the threshold Vth2 from the configuration information input unit 6 to the threshold level changing unit 14, and, in step ST9, carries out ultrasonic wave transmission and reception using the transmission and reception ultrasonic sensors 4-1 to 4-4.

The obstacle determination unit then, in step ST10, determines whether or not the height of the obstacle is equal to or lower than H12, and, when determining NO, shifts to step ST14, whereas when determining YES, the obstacle determination unit, in step ST11, sets the threshold Vth3 from the configuration information input unit 6 to the threshold level changing unit 14, and, in step ST12, carries out ultrasonic wave transmission and reception using the transmission and reception ultrasonic sensors 4-1 to 4-4.

The obstacle determination unit then, in step ST13, determines whether or not the height of the obstacle is equal to or lower than H13, and, when determining either of YES and NO, shifts to step ST14. The obstacle determination unit, in step ST14, determines the position of the obstacle (the horizontal bearing and the height), and, in step ST15, overlays information showing the position of the obstacle on the image captured by the camera 3 when, in step ST14, determining that the obstacle is significant.

Figure 9:
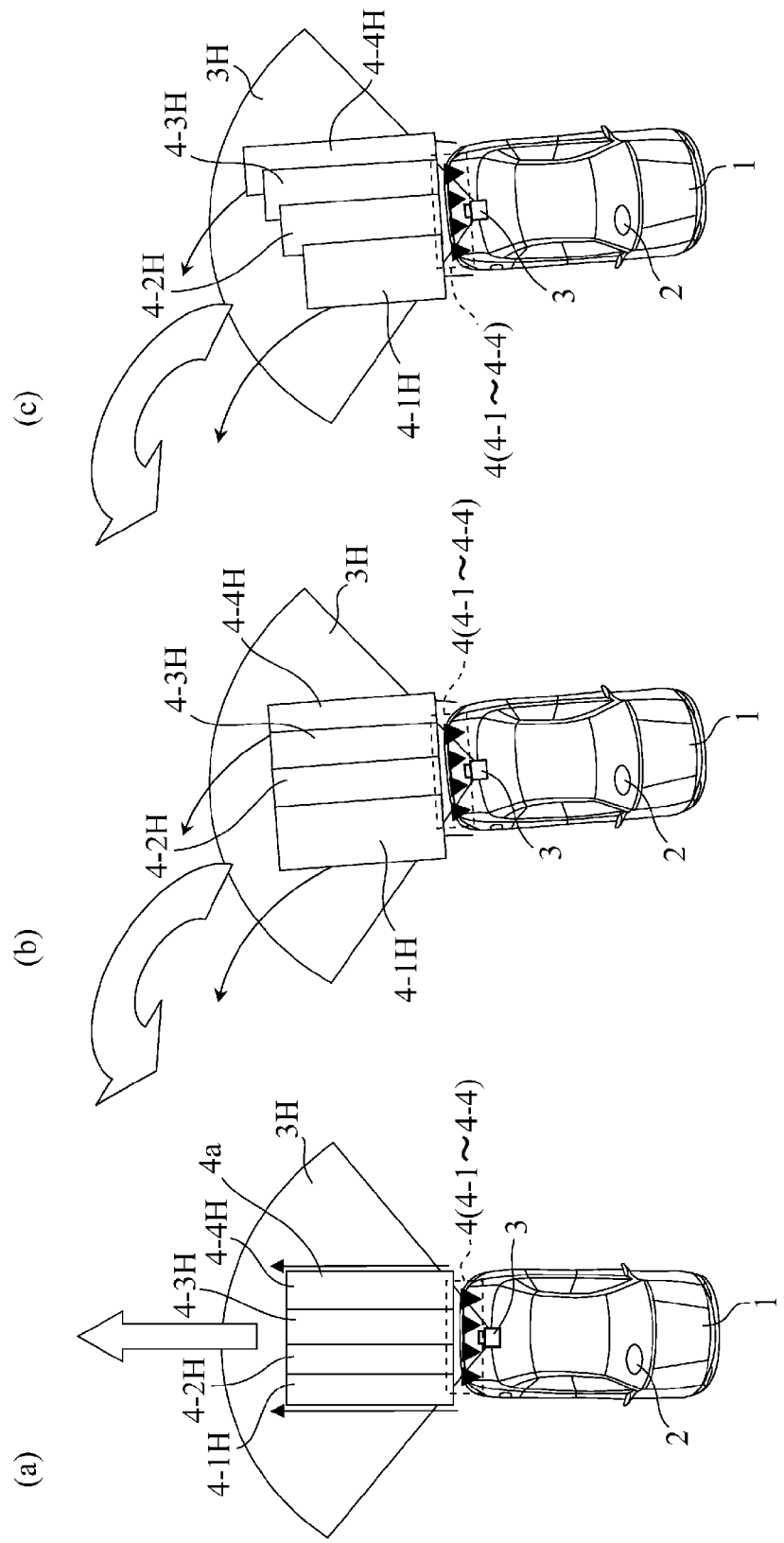
FIG. 9 is a view showing changes of the horizontal detection areas of the distance sensors between at a time when a vehicle is travelling backward in a straight line and at a time when the vehicle is travelling backward round a bend.

FIG. 9(a) shows the image capturing area 3H of the camera 3 and the ultrasonic detection areas 4-1H to 4-nH of the transmission and reception ultrasonic sensors 4-1 to 4-4 at a time when the vehicle is travelling backward in a straight line. When the vehicle is travelling backward in a straight line, the detection areas 4-1H to 4-nH of the transmission and reception ultrasonic sensors 4-1 to 4-4 are set to have a uniform width according to the thresholds Vth1 to Vth3.

Figure 10:
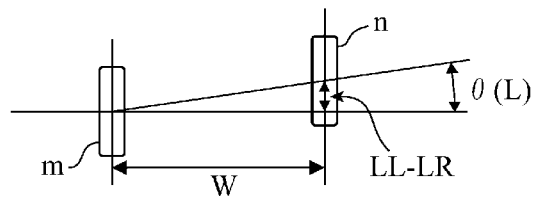
FIG. 10 is an explanatory drawing explaining a relation between an inner wheel (a left rear wheel) and an outer wheel (a right rear wheel) of the vehicle travelling backward.
Figure 11:
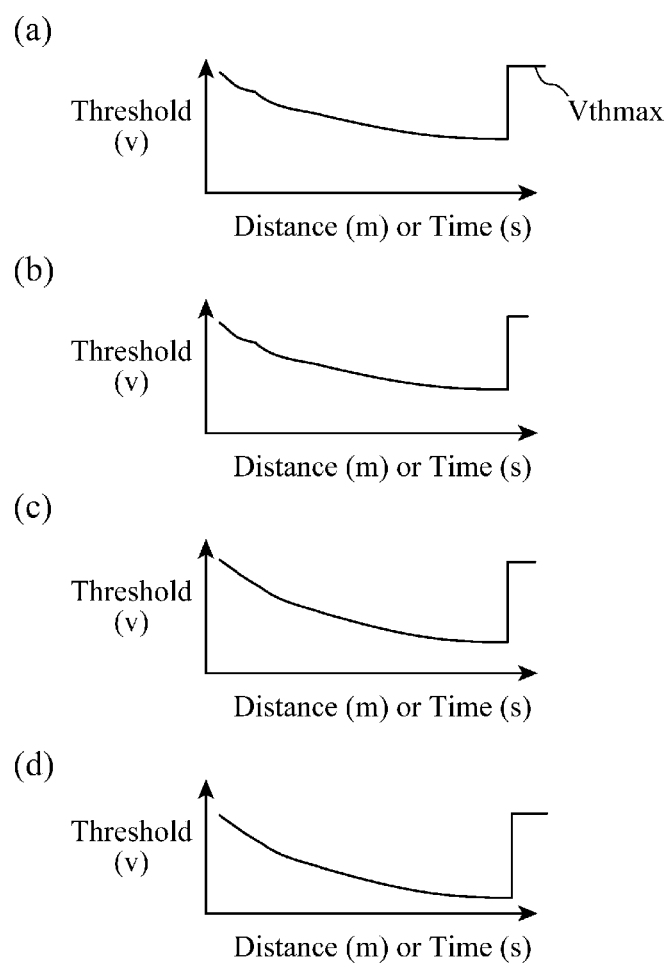
FIG. 11 is a characteristic diagram showing a relation between the distance or time and the threshold.
Figure 12:
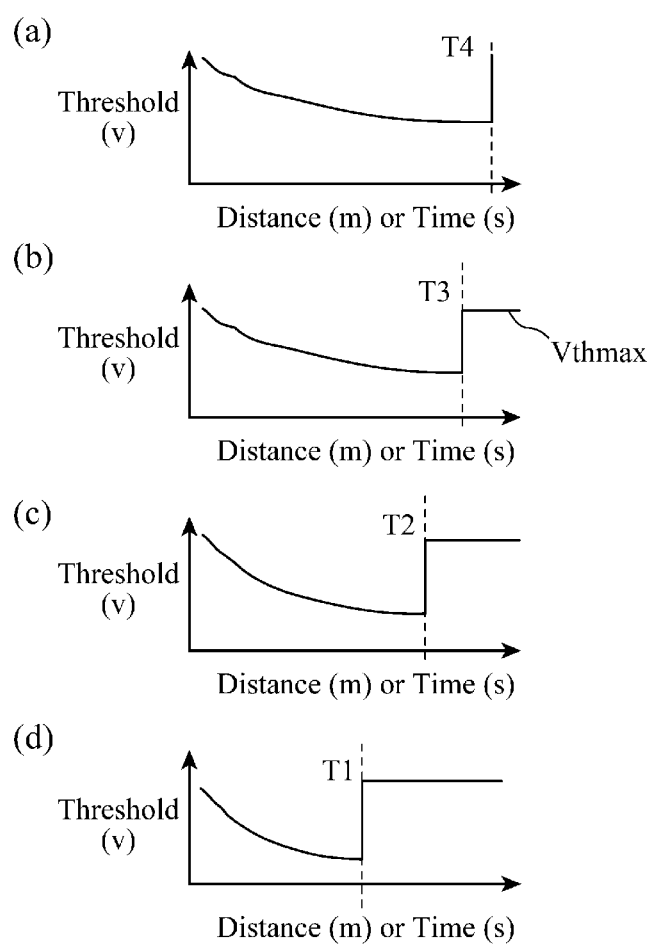
FIG. 12 is a characteristic diagram showing a relation between the distance or time and the threshold.

FIG. 9(a) shows the image capturing area 3H of the camera 3 and the ultrasonic detection areas 4-1H to 4-nH of the transmission and reception ultrasonic sensors 4-1 to 4-4 at a time when the vehicle is travelling backward round a bend. From a steering angle signal from the steering angle sensor 2 or wheel speed signals from the wheel speed sensors at a time when the vehicle is travelling backward round a bend, the travelling path predicting unit 12 determines the turning radius of either an inner wheel m or an outer wheel n shown in FIG. 10.

In the case of using the steering angle signal from the steering angle sensor

The turning radius R of the inner wheel (or outer wheel)= $\alpha \cdot \theta(D)$ where $\alpha$ is a transformation constant and $\theta(D)$ is the steering angle.

In the case of using the wheel speed signals from the wheel speed sensors

The turning radius R of the inner wheel (or outer wheel)= $\beta \cdot \theta(L)$ where $\theta(L)=\tan^{-1}(LL-LR)/W$, LL is an accumulated travel distance of the left rear wheel, LR is an accumulated travel distance of the right rear wheel, W is the distance between the wheels of the rear wheelset, and $\beta$ is a transformation constant.

When then receiving the turning radius determined by the travelling path predicting unit 12, the threshold level changing unit 14 changes the thresholds of the transmission and reception ultrasonic sensor 4-1 to 4-4, as shown in FIGS. 11(a) to 11(d), to set the detection threshold level of the distance sensor 4-1 on the side of the inner wheel m to a lower one in such a way that the horizontal detection area 4-1H of the distance sensor 4-1 becomes wider than that at a time when the vehicle is travelling straight ahead, and also set the detection threshold level of the distance sensor on the side of the outer wheel n to a higher one in such a way that the horizontal detection area of the distance sensor becomes narrower than that at a time when the vehicle is travelling straight ahead.

Further, FIG. 9(c) shows another example at a time when the vehicle is travelling backward round a bend. In this example, when receiving the turning radius determined by the travelling path predicting unit 12, the threshold level changing unit 14 changes the thresholds of the transmission and reception ultrasonic sensor 4-1 to 4-4, as shown in FIGS. 12(a) to 12(d), to set the detection threshold level of the distance sensor 4-1 on the side of the inner wheel in to a lower one in such a way that the horizontal detection area of the distance sensor 4-1 becomes wider than that at a time when the vehicle is travelling straight ahead, and also set the detection threshold level of the distance sensor 4-4 on the side of the outer wheel n to a higher one in such a way that the horizontal detection area of the distance sensor becomes narrower than that at a time when the vehicle is travelling straight ahead, while the coverage of the horizontal detection area of the distance sensor on the side of the inner wheel m is made to be shorter than that of the horizontal detection area of the distance sensor on the side of the outer wheel n. As a method of setting the coverages in this way, there is a method of setting a maximum Vthmax as the threshold level or a method of setting one of time gates T1 to T4.

Figure 13:
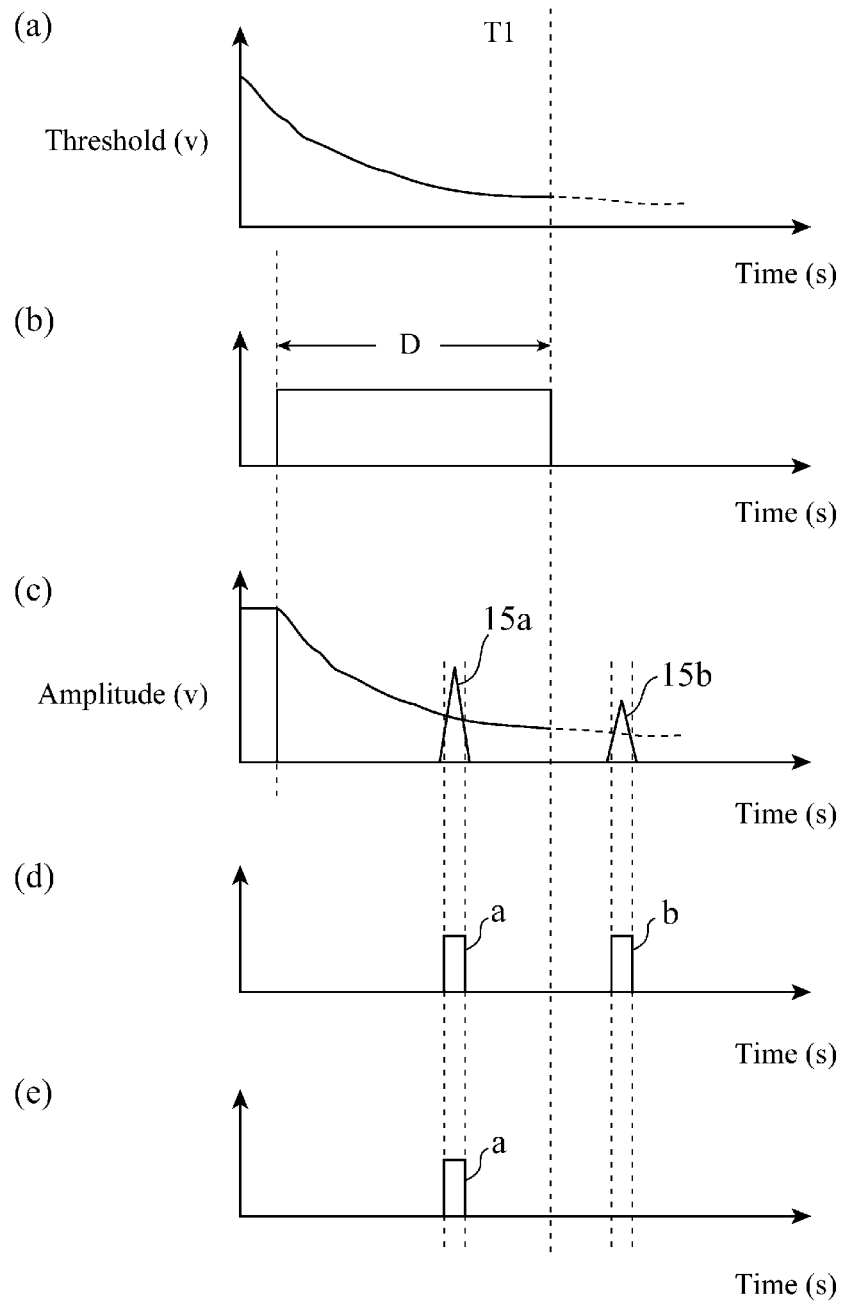
FIG. 13 is an explanatory drawing of a time gate.

As shown in FIG. 13, these time gates are used to determine a time (distance) range effective for the determination of whether or not an obstacle is existing. When the time gate T1 is set for a threshold having time-varying characteristics as shown in FIG. 13(a), a range D as shown in FIG. 13(b) is defined as an effective determination range. Although signals respectively showing obstacles 15a and 15b and included in a received signal of a transmission and reception ultrasonic sensor, as shown in the FIG. 13(c), are received as obstacle detection signals a and b as shown in FIG. 13(d), only the obstacle detection signal a falling within the effective determination range D which is set according to the time gate T1 is outputted.

Figure 14:
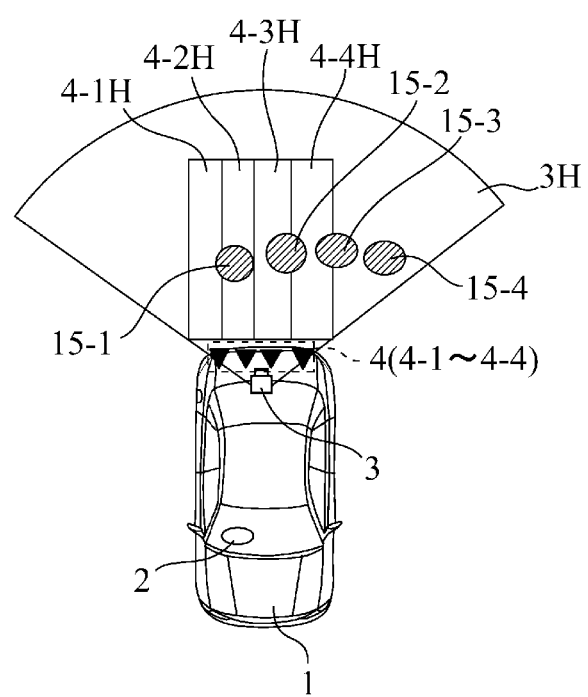
FIG. 14 is a view showing a state in which obstacles are existing in the image capturing area of a camera and the detection areas of distance sensors.

FIG. 14 shows a state in which the vehicle rear view monitoring device detects obstacles 15-1 to 15-3 by using the image capturing area 3H of the camera 3 and the ultrasonic detection areas 4-1H to 4-nH of the transmission and reception ultrasonic sensors 4-1 to 4-4 at a time when the vehicle is travelling backward in a straight line as shown in FIG. 9(a).

Figure 15:
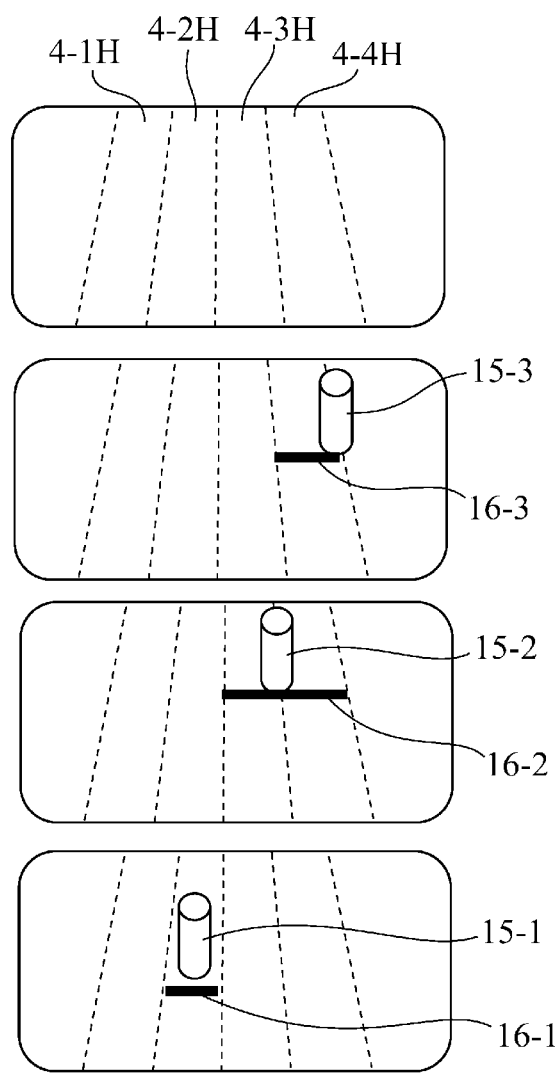
FIG. 15 is a view showing a state in which obstacle marks are displayed on a screen while being overlaid on obstacles detected and shown in FIG. 14.

FIG. 15 is a view in which obstacle marks 16-1 to 16-3 are overlaid on the image captured by the camera 3 while being arranged at positions corresponding to the positions of the obstacles detected by the above-mentioned transmission and reception ultrasonic sensors 4-1 to 4-4 in order to specify the positions of the obstacles 15-1 to 15-3.

Figure 16:
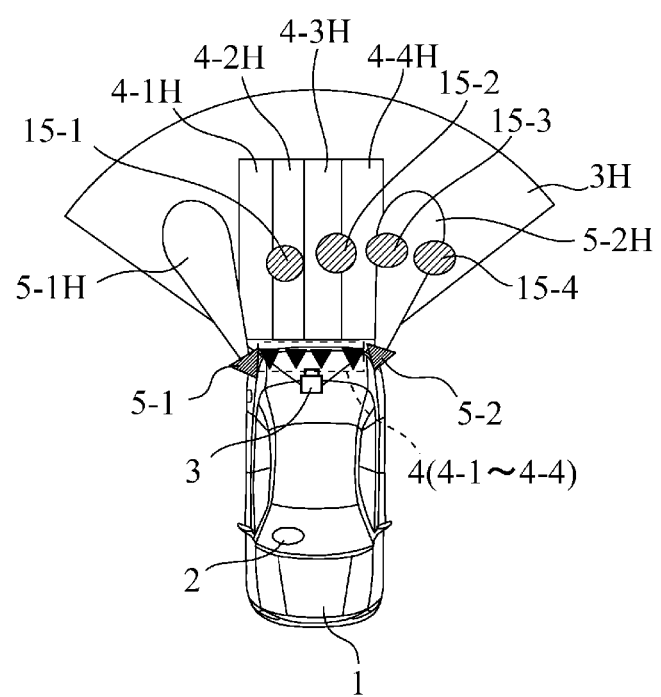
FIG. 16 is a view showing a state in which obstacles are existing in the image capturing area of a camera, the detection areas of distance sensors, and the detection area of a steering sensor.

FIG. 16 shows a state in which the vehicle rear view monitoring device detects obstacles 15-1 to 15-4 in a detection area including the detection areas 5-1H and 5-2H of the corner sensors 5-1 and 5-2 disposed on both the sides of the rear end surface of the vehicle 1.

Figure 17:
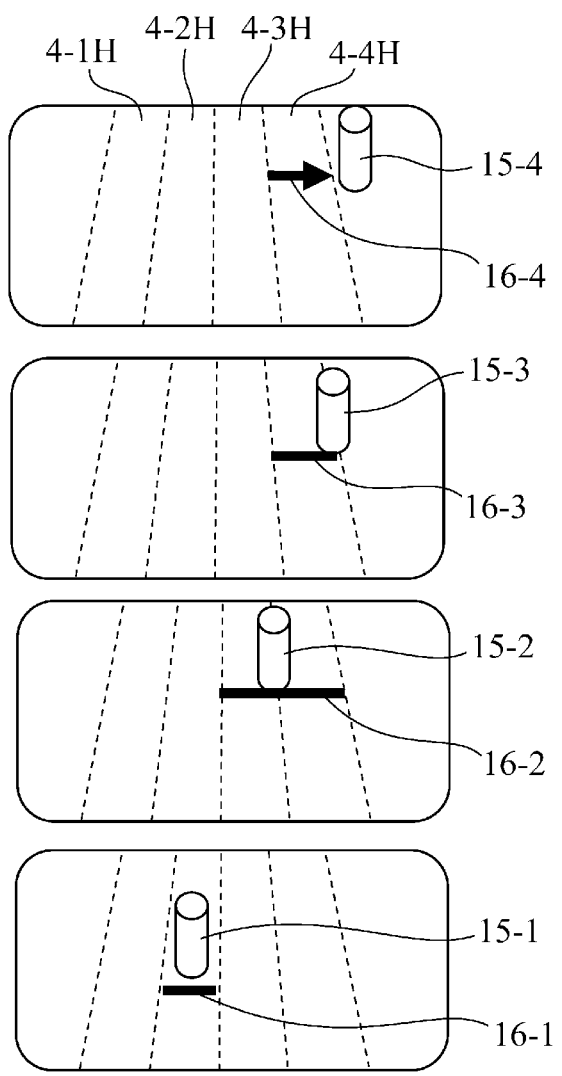
FIG. 17 is a view showing a state in which obstacle marks are displayed on a screen while being overlaid on obstacles detected and shown in FIG. 16.

FIG. 17 is a view in which obstacle marks 16-1 to 16-3 are overlaid on the image captured by the camera 3 while being arranged at positions corresponding to the positions of the obstacles detected by the above-mentioned transmission and reception ultrasonic sensors 4-1 to 4-4 and the above-mentioned corner sensors 5-1 and 5-2 in order to specify the positions of the obstacles 15-1 to 15-4. In this case, because the obstacle 15-4 is existing outside the detection areas of the transmission and reception ultrasonic sensors 4-1 to 4-4, the vehicle rear view monitoring device overlays an arrow-shaped obstacle mark 16-4 to make a distinction between this mark and the other marks.

Figure 18:
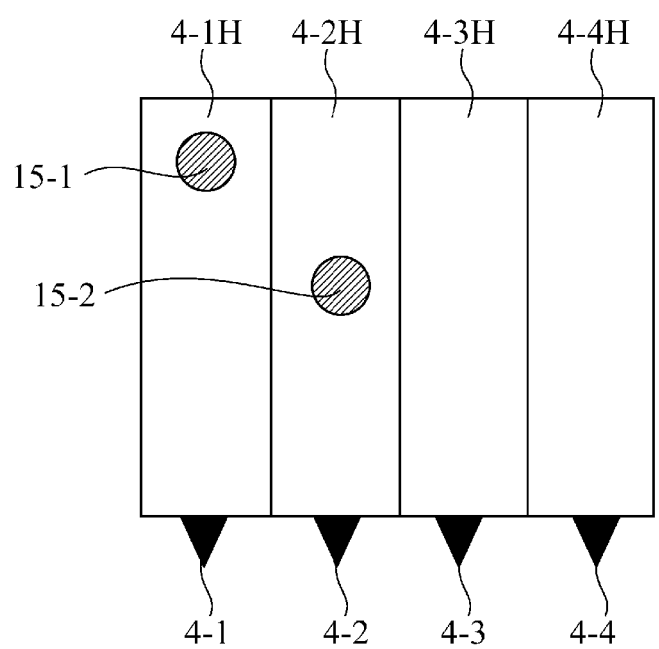
FIG. 18 is a view showing a state in which obstacles are located in some of the detection areas of a plurality of distance sensors.

FIG. 18 shows a state in which the rectangle-shaped detection areas 4-1H to 4-4H of the transmission and reception ultrasonic sensors 4-1 to 4-4 are arranged in parallel with one another in such a way that the rectangle-shaped detection areas 4-1H to 4-4H do not overlap one another, as shown in FIG. 5, and obstacles 15-1 and 15-2 are detected in the adjacent detection areas 4-1H and 4-2H, respectively.

FIG. 19(a) shows the transmitting and receiving states of the transmission and reception ultrasonic sensor 4-1 to 4-4 in the state shown in FIG. 18. In this state, the transmission and reception ultrasonic sensors 4-1 to 4-4 send out ultrasonic waves at a time t0, the transmission and reception ultrasonic sensor 4-2 receives a reflected wave from the obstacle 15-2 at a time t1, and the transmission and reception ultrasonic sensor 4-1 receives a reflected wave from the obstacle 15-1 at a time t2.

The vehicle rear view monitoring device detects the obstacles 15-1 and 15-2 from these reflected waves and displays them on the image captured by the camera 3, as shown in FIG. 19(b), and also overlays an obstacle mark 16-2 on the obstacle 15-2 because this obstacle 15-2 is closer to the vehicle 1. At this time, when the time difference between the detection times t1 and t2 of the obstacles shown in FIG. 19(a) is equal to or smaller than a preset allowable value Tth, the vehicle rear view monitoring device overlays an obstacle mark 16-2 over both the detection areas (4-1H and 4-2H), as shown in FIG. 19(c).

Figure 20:
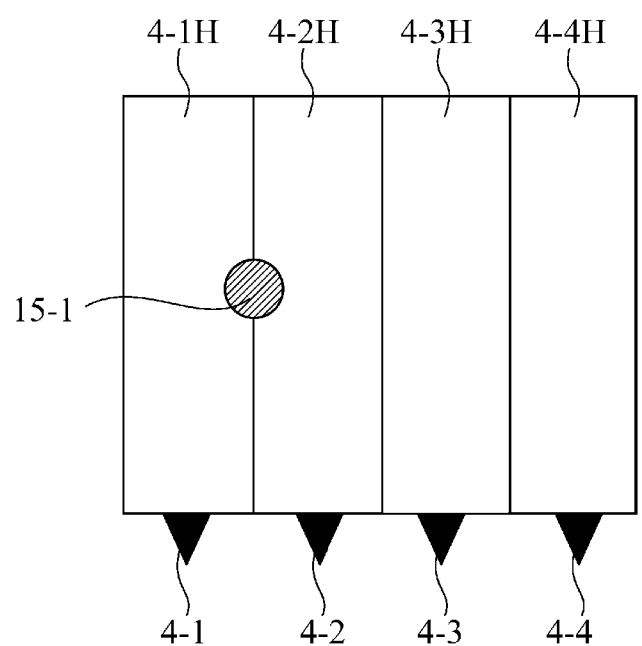
FIG. 20 is a view showing a state in which an obstacle is existing over the detection areas of two adjacent ones of the plurality of distance sensors.

FIG. 20 shows a state in which the rectangle-shaped detection areas 4-1H to 4-4H of the transmission and reception ultrasonic sensors 4-1 to 4-4 are arranged in parallel with one another in such a way that the rectangle-shaped detection areas 4-1H to 4-4H do not overlap one another, as shown in FIG. 5, and an obstacle 15-1 is detected on the boundary between the adjacent detection areas 4-1H and 4-2H.

FIG. 21(a) shows an example of the transmitting and receiving states of the transmission and reception ultrasonic sensor 4-1 to 4-4 in the state shown in FIG. 20. In this state, the transmission and reception ultrasonic sensors 4-1 to 4-4 send out ultrasonic waves at a time t0, and the transmission and reception ultrasonic sensors 4-1 and 4-2 receive reflected waves from the obstacle 15-1 at a time t1.

In this example, the vehicle rear view monitoring device detects the obstacle 15-1 from these reflected waves, and, when specifying the position of the obstacle 15-1 at the position detected on the image captured by the camera 3, as shown in FIG. 21(b), the amplitude Vs1 of the reflected wave detected by the transmission and reception ultrasonic sensor 4-1 is larger than the amplitude Vs2 of the reflected wave detected by the transmission and reception ultrasonic sensor 4-2, and therefore |Vs1−Vs2| exceeds a preset allowable value Vth. Therefore, the vehicle rear view monitoring device overlays an obstacle mark 16-1 on the detection area of this transmission and reception ultrasonic sensor 4-1.

In contrast, in an example shown in FIG. 22(a) in which the transmission and reception ultrasonic sensors 4-1 to 4-4 send out ultrasonic waves at a time t0, and the transmission and reception ultrasonic sensors 4-1 and 4-2 receive reflected waves from an obstacle 15-2 at a time t1, and the amplitudes Vs1 and Vs2 of the reflected waves received by these transmission and reception ultrasonic sensors 4-1 and 4-2 are substantially the same as each other, that is, |Vs1−Vs2| is equal to or smaller than the preset allowable value Vth, the vehicle rear view monitoring device overlays an obstacle mark 16-2 on the detection areas of the transmission and reception ultrasonic sensors 4-1 and 4-2, as shown in FIG. 22(*b*).

Figure 23:
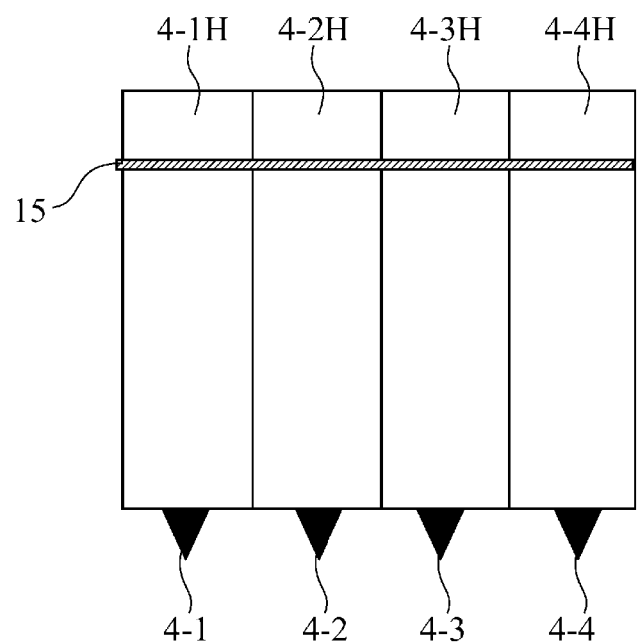
FIG. 23 is a view showing a state in which an obstacle is located over all of the detection areas of the plurality of distance sensors.

FIG. 23 shows a state in which the rectangle-shaped detection areas 4-1H to 4-4H of the transmission and reception ultrasonic sensors 4-1 to 4-4 are arranged in parallel with one another in such a way that the rectangle-shaped detection areas 4-1H to 4-4H do not overlap one another, as shown in FIG. 5, and an obstacle 15-L having a length equal to or longer than the width of the vehicle, such as a plane wall, is detected.

FIG. 24(*a*) shows the transmitting and receiving states of the transmission and reception ultrasonic sensors 4-1 to 4-4 in the state shown in FIG. 23. In this state, the transmission and reception ultrasonic sensors 4-1 to 4-4 send out ultrasonic waves at a time t0, and the transmission and reception ultrasonic sensors 4-1 to 4-4 receive reflected waves from the obstacle 15-L at a time t1.

When specifying the position of the obstacle 15-L on the image captured by the camera 3 from these reflected waves, as shown in FIG. 24(*b*), the vehicle rear view monitoring device overlays an obstacle mark 16-L over all of the detection areas 4-1H to 4-4H of the transmission and reception ultrasonic sensors 4-1 to 4-4 because the amplitudes of the reflected waves detected by the transmission and reception ultrasonic sensors 4-1 to 4-4 are substantially the same as one another.

As mentioned above, because the vehicle rear view monitoring device in accordance with this embodiment can determine the horizontal position of an obstacle, the vehicle rear view monitoring device can improve the degree of positional precision of an overlay of an obstacle mark on the obstacle shown in an image captured thereby.

Further, because the vehicle rear view monitoring device in accordance with this embodiment changes the detection threshold level of each distance sensor to form the detection area of that distance sensor into a rectangular or radial shape, and arrange the detection areas of any two horizontally adjacent distance sensors in such a way that the detection areas partially overlap each other or the detection areas do not overlap each other, and, when arranging the detection areas of any two horizontally adjacent distance sensors in such a way that the detection areas partially overlap each other, implements a logical AND operation on the results of detections at the same distance by two adjacent distance sensors to determine the bearing of the obstacle, the vehicle rear view monitoring device improves the horizontal position resolution.

According to the angle information from the steering angle sensor, the vehicle rear view monitoring device sets the detection threshold level of the distance sensor on the side of the inner wheel to a lower level in such a way that the distance sensor the distance sensor has a wider horizontal detection area than that at a time when the vehicle is travelling straight ahead, and also sets the detection threshold level of the distance sensor disposed on the side of the outer wheel to a higher level in such a way that the distance sensor has a narrower horizontal detection area than that at the time when the vehicle is travelling straight ahead. Therefore, because the vehicle rear view monitoring device can detect only an obstacle existing in an area through which the vehicle is passing, the vehicle rear view monitoring device does not output information unnecessary for the driver, thereby reducing the load on the driver.

Because the vehicle rear view monitoring device sequentially changes the detection threshold level to change the vertical detection area to determine the height of the obstacle in a detection area having a detectable maximum height, the vehicle rear view monitoring device can acquire information about the obstacle in a direction of the height of the obstacle and easily make a distinction between a low-lying obstacle, such as a curbstone, and other objects.

Because the vehicle rear view monitoring device acquires the steering angle while sequentially changing the detection threshold level to change the vertical detection area of each distance sensor, and makes a distinction between an inside area whose width is the same as that of the vehicle travelling, and an area outside the inside area having the same width as the vehicle to determine a detectable area while changing the detection areas on both the right and left sides of the vehicle according to the steering angle, the vehicle rear view monitoring device can delete unnecessary detection information.

Because the vehicle rear view monitoring device makes it possible to detect the entrance of a moving obstacle into the inside area having the same width as the vehicle by grasping the time-varying state of detection of the obstacle according to the movement locus information of the vehicle, the vehicle rear view monitoring device can predict the possibility that the vehicle collides with the moving object moving horizontally by tracking this moving object.

Because when an obstacle whose distance between a leading edge portion thereof including a direction of the height of the obstacle specified by the distance sensors and the vehicle is the shortest is existing and can collide with the vehicle, the vehicle rear view monitoring device overlays the obstacle mark on the camera image, the vehicle rear view monitoring device does not display any obstacle mark on a low-lying obstacle with which the vehicle cannot collide. Therefore, the vehicle rear view monitoring device can improve the precision with which an obstacle determination unit determines whether or not the vehicle can collide with the object.

Because when a corner sensor mounted to a corner portion of the vehicle detects an obstacle existing in the area outside the inside area having the same width as the vehicle or when it is detected that an obstacle is existing in the area outside the inside area through a recognition process performed on the camera image, the vehicle rear view monitoring device overlays the obstacle mark on a camera image of an area outside the detection areas of the distance sensors, the vehicle rear view monitoring device enables the driver to recognize the existence of an obstacle in advance before a collision with this object occurs.

Because when the distances detected by a plurality of adjacent distance sensors fall within the allowable range Tth, the vehicle rear view monitoring device overlays the obstacle mark over the detection areas of the distance sensors, whereas the distances exceed the allowable range Tth, the vehicle rear view monitoring device overlays the obstacle mark at an obstacle position positioned at a shorter distance, the vehicle rear view monitoring device detects an obstacle having a length equal to or longer than the width of the vehicle, such as a plane wall, over a wider area having the total width of the vehicle or more at the same distance, as compared with a case in which the vehicle rear view monitoring device detects an obstacle having a narrower width, such as a utility pole, the vehicle rear view monitoring device is effective for a case in which an obstacle is existing an area where the detection areas of sensors overlap each other.

Because when the distances detected by a plurality of adjacent distance sensors fall within the allowable range Tth, and the level difference between the reflected waves originated from the ultrasonic waves from adjacent ultrasonic sensors and reflected from the obstacle is equal to or smaller than the predetermined allowable value Vth, the vehicle rear view monitoring device overlays the obstacle mark over the detection areas of the above-mentioned ultrasonic sensors, whereas when the above-mentioned level difference between the reflected waves exceeds the allowable value Vth, the vehicle rear view monitoring device overlays the obstacle mark on the detection area of the distance sensor providing a higher level of reflected wave, the vehicle rear view monitoring device is effective for a case in which an obstacle is existing an area where the detection areas of sensors overlap each other. When the obstacle is a plane wall having a length equal to or longer than the width of the vehicle, the vehicle rearview monitoring device determines that the obstacle is existing in all of the detection areas, and overlays the obstacle mark over all of the detection areas.

Although in the explanation of each of the embodiments illustrated, the example in which ultrasonic sensors are used as the distance sensors is shown, laser sensors can be alternatively used as distance sensors. Also in this case, the same operation effects and the same advantages can be provided.

INDUSTRIAL APPLICABILITY

As mentioned above, because the vehicle rear view monitoring device in accordance with the present invention can detect an obstacle existing behind a vehicle, the vehicle rear view monitoring device is suitable for use in a vehicle.

The invention claimed is:

1. A vehicle rear view monitoring device including a plurality of distance sensors each for detecting a distance to an obstacle, a threshold level changing unit for changing a detection threshold level of each of said distance sensors to change a horizontal detection area, a vertical detection area, and a bearing resolution, an obstacle determination unit for determining whether or not an obstacle is existing according to a threshold level outputted from said threshold level changing unit and received signals of said distance sensors, and a display screen switching unit for changing a display image between a directly-captured image and a bird's-eye view image according to the distance to the obstacle determined by said obstacle determination unit, wherein said vehicle rear view monitoring device comprises:

an overlay unit for measuring a bearing of the obstacle and a distance to the obstacle from a position where each of said distance sensors is mounted and the distance to the obstacle, and amplitude information about an amplitude of a reflected wave from the obstacle, the position and the distance to the obstacle being determined by said obstacle determination unit, for determining a display position and a shape of an obstacle mark according to a corresponding distance and a corresponding bearing on a screen, for changing a display image as an expression of the obstacle mark between a directly-captured image and a bird's-eye view image when the distance to the obstacle determined by said obstacle determination unit has a predetermined value, and for overlaying the obstacle mark having said determined shape on an image captured by a camera and furnished from said display screen switching unit in such a way that the obstacle mark is positioned at said determined display position.

2. The vehicle rear view monitoring device according to claim 1, wherein the threshold level changing unit has a function of changing the detection threshold level according to propagating distance-sensitivity characteristics of the distance sensors and on a basis of a propagation distance or a propagation time to form each of the distance sensors into a rectangular or radial shape, and arrange the detection areas of any two distance sensors located horizontally adjacent to each other in such a way that they partially overlap each other or they do not overlap each other, and a function of, when arranging the detection areas of any two distance sensors located horizontally adjacent to each other in such a way that they partially overlap each other, implementing a logical AND operation on results of detection of the object at a same distance by adjacent distance sensors to determine a bearing of the obstacle.

3. The vehicle rear view monitoring device according to claim 1, wherein said vehicle rear view monitoring device includes a steering angle sensor, and the threshold level changing unit has a function of setting the detection threshold level of a distance sensor disposed on a side of an inner wheel to a lower level according to angle information of the steering angle sensor in such a way that the distance sensor has a wider horizontal detection area than that at a time when a vehicle is travelling straight ahead, and also setting the detection threshold level of a distance sensor disposed on a side of an outer wheel to a higher level according to the angle information in such a way that the distance sensor has a narrower horizontal detection area than that at the time when the vehicle is travelling straight ahead.

4. The vehicle rear view monitoring device according to claim 3, wherein the threshold level changing unit has a function of acquiring a steering angle from the steering angle sensor while sequentially changing the detection threshold level to change the horizontal detection area, and making a distinction between an inside area whose width is same as that of the vehicle travelling, and an area outside the inside area having the same width as the vehicle to determine a detectable area.

5. The vehicle rear view monitoring device according to claim 4, wherein the vehicle rear view monitoring device has wheel speed sensors, and makes it possible to detect entrance of a moving obstacle into the inside area having the same width as the vehicle by grasping a time-varying state of detection of the obstacle according to movement locus information of the vehicle which said vehicle rear view monitoring device calculates by using information from said wheel sensors.

6. The vehicle rear view monitoring device according to claim 4, wherein when a corner sensor mounted to a corner portion of the vehicle detects an obstacle existing in the area outside the inside area having the same width as the vehicle or when it is detected that an obstacle is existing in the area outside the inside area through a recognition process performed on the camera image, the overlay unit overlays the obstacle mark on a camera image of an area outside the detection areas of the distance sensors.

7. The vehicle rear view monitoring device according to claim 3, wherein when an obstacle whose distance between a leading edge portion thereof including a direction of a height of the obstacle specified by the distance sensors and the vehicle is shortest is existing and can collide with the vehicle, the overlay unit overlays the obstacle mark on the camera image.

8. The vehicle rear view monitoring device according to claim 7, wherein when distances detected by a plurality of adjacent distance sensors fall within an allowable range Tth, the overlay unit overlays the obstacle mark over the detection areas of said distance sensors, whereas the distances exceed the allowable range Tth, the overlay unit overlays the obstacle mark at an obstacle position positioned at a shorter distance.

9. The vehicle rear view monitoring device according to claim 7, wherein when distances detected by a plurality of adjacent distance sensors fall within an allowable range Tth, and a level difference between reflected waves originated from ultrasonic waves from adjacent ultrasonic sensors and reflected from the obstacle is equal to or smaller than a predetermined allowable value Vth, the overlay unit overlays the obstacle mark over the detection areas of said ultrasonic sensors, whereas when said level difference between the reflected waves exceeds the allowable value Vth, the overlay unit overlays the obstacle mark on the detection area of the distance sensor providing a higher level of reflected wave.

10. The vehicle rear view monitoring device according to claim 1, wherein the threshold level changing unit has a function of sequentially changing the detection threshold level to change the vertical detection area to determine a height of the obstacle in a detection area having a detectable maximum height.

* * * * *